(No Model.)
G. H. PRESTON.
Hay Rake.
No. 243,081. Patented June 21, 1881.
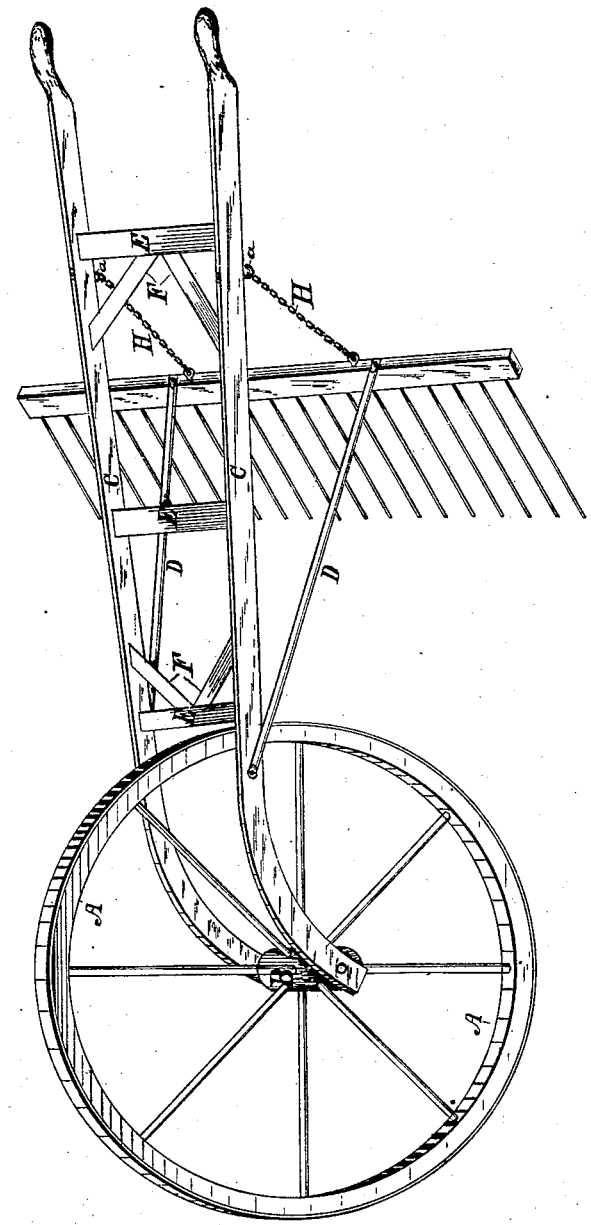
WITNESSES:
INVENTOR:
Geo. H. Preston
BY
ATTORNEYS.

UNITED STATES PATENT OFFICE.

GEORGE H. PRESTON, OF OTTAWA, ONTARIO, CANADA.

HAY-RAKE.

SPECIFICATION forming part of Letters Patent No. 243,081, dated June 21, 1881.

Application filed September 24, 1880. (No model.)

*To all whom it may concern:*

Be it known that I, GEORGE H. PRESTON, residing at Ottawa, in Ontario, Canada, have invented a new and Improved Hay-Rake, of which the following is a full, clear, and exact specification, reference being had to the accompanying drawing, forming part thereof.

My invention has for its object the production of an improved hay-rake of the class in which the rake proper is attached to and supported by a wheeled frame with handles for propelling it.

The improvement consists in attaching the rake proper to the rear portion of the frame or handles, in rear of a transporting-wheel, by means of braces that are pivoted to the frame, and chains which may be adjusted in length as required to adapt the implement for convenient use by persons of different height.

In the drawing a perspective view of my improved rake is represented.

The frame of the rake consists of the bars C C, whose rear ends serve as handles, the parallel cross-bars E E, that connect them, and the pairs of diagonal braces F F, that are applied to such other parts, as shown. The forward ends of the bars C C are pivoted to an axle passing through the hub B of a large transporting-wheel, A.

The wooden rake G is attached to and suspended beneath the bars C C by means of chains H H and bars D D. The latter are pivoted at their front ends to the bars C C at points opposite, or nearly so, to the rim of wheel A, and their rear ends are rigidly attached to the rake-head G, so that it is allowed to move vertically in the parallel arcs of circles whose centers are the respective pivots of bars D, which serve as traction devices when the rake is in use.

The chains H H limit the distance to which the rake proper, G, may be separated from the frame or handles C C, but allow the rake to rise and fall independently, so that it may follow the inequalities of the ground freely. The chains are attached to hooks *a a*, so that they may be adjusted in length to allow such distance to be varied as required to adapt the implement for use by persons of different stature.

To use the rake, the operator seizes the handles or rear ends of bars C C and supports them a sufficient height from the ground to enable the rake-teeth to run over the surface as closely as practicable and take up the hay. To free the rake from a quantity of gathered hay, the operator elevates the handles to the required height, the axle of wheel A serving in such case as a fulcrum for the bars C and the rake G attached to them.

Having thus fully described my invention, what I claim as new, and desire to secure by Letters Patent, is—

In a hay-rake, the combination, with the bars or handles C C and the wheel A for supporting their forward ends, of the rake G and the pivoted braces D D and chains H, which connect it with and suspend it from said bars, so that it has freedom of movement within certain limits, as shown and described.

GEORGE HOVEY PRESTON.

Witnesses:
EDWARD VALENTINE JOHNSON,
JAMES ROBERT CHAMBERLAIN.